UNITED STATES PATENT OFFICE.

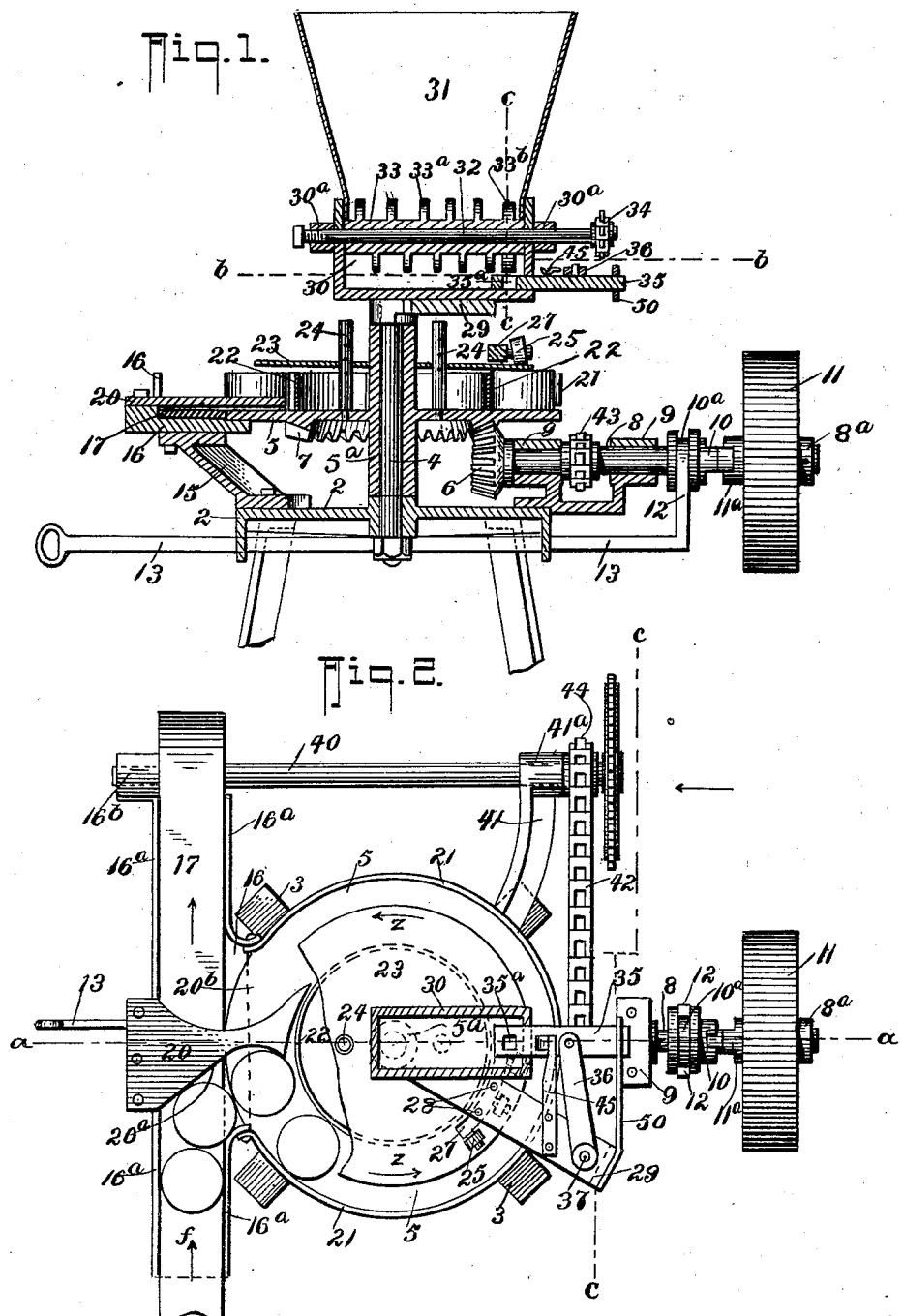

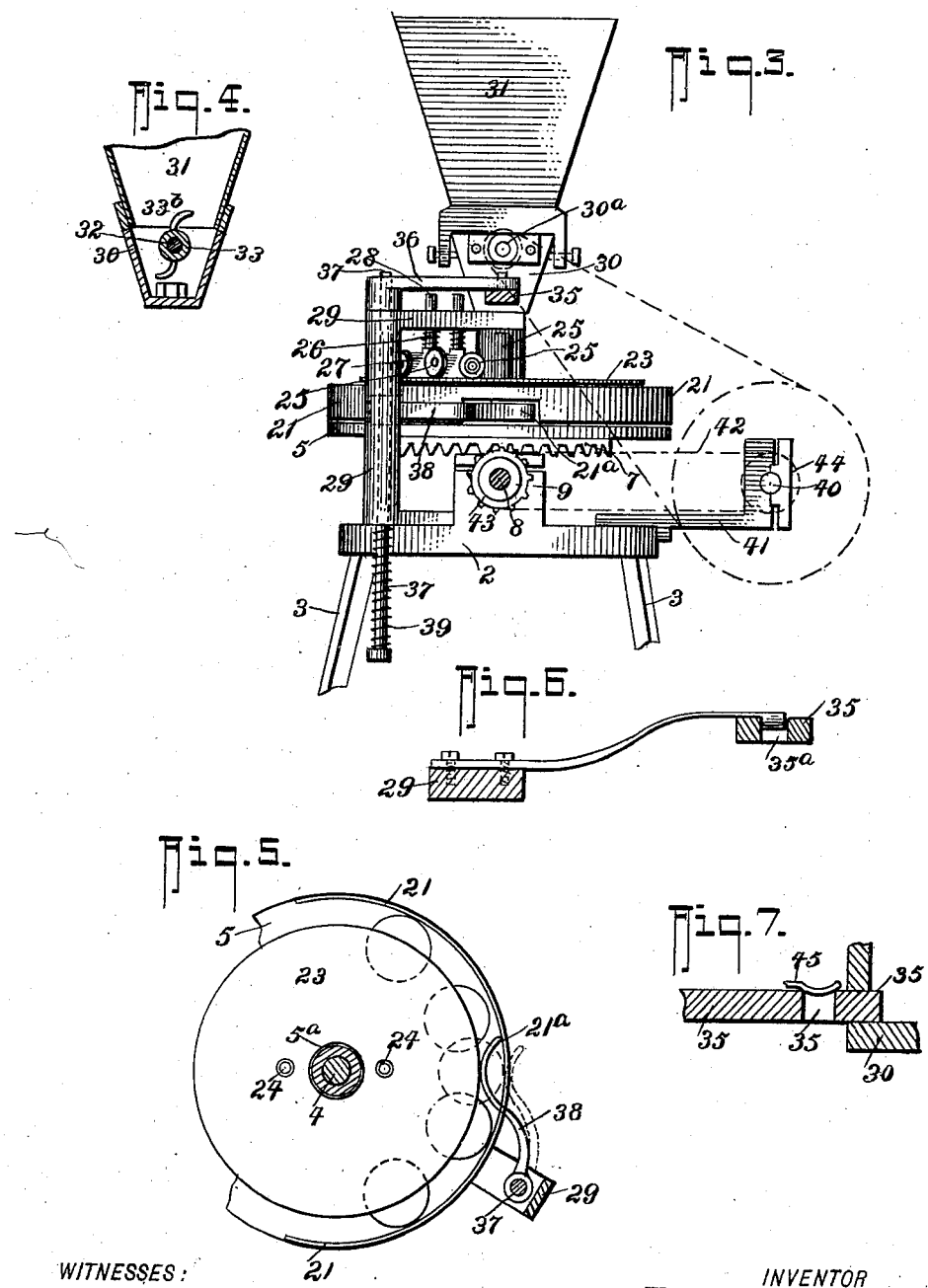

JOHN KELLINGTON, OF NEW WESTMINSTER, CANADA, ASSIGNOR OF ONE-HALF TO DANIEL J. MUNN AND ALEXANDER EWEN, OF NEW WESTMINSTER, CANADA.

MACHINE FOR SALTING FISH OR MEAT IN CANS.

SPECIFICATION forming part of Letters Patent No. 711,426, dated October 14, 1902.

Application filed March 4, 1902. Serial No. 96,677. (No model.)

*To all whom it may concern:*

Be it known that I, JOHN KELLINGTON, a citizen of the Dominion of Canada, residing at New Westminster, in the Province of British Columbia, Canada, have invented a new and useful Machine for Salting Fish or Meat in Cans, of which the following is a specification.

My invention relates to a machine for measuring at regular intervals a required quantity of salt and depositing the same automatically in cans of fish or meat. Though especially designed to meet the requirements of salmon-canning, it is quite conceivable that my machine may be applicable to other similar industries where like conditions prevail. This work is at present, to the best of my knowledge, performed entirely by hand, and the use of my machine will enable it to be done more rapidly and uniformly, while it will dispense with the necessity of employing low-class oriental labor, the presence of which in the preparation or packing of an article of food is always looked on with disfavor by the general public and has many drawbacks.

My machine is also designed that it may be interposed in the conveyer-belt service of a cannery without inconvenience or change of the existing plant, and the major part of it is of a standard type as used by me for other canning machinery.

The machine is fully illustrated in the drawings herewith, in which—

Figure 1 is a vertical section on the line $a\,a$ in Fig. 2; Fig. 2, a sectional plan on the line $b\,b$ in Fig. 1; Fig. 3, an end elevation of the operating mechanism of the salt-vessel slide; Fig. 4, a cross-section of the salt vessel on the line $c\,c$ in Fig. 1; Fig. 5, a plan of the can-operating lever for such. Figs. 6 and 7 are enlarged details of the slide-aperture and its discharge-spring.

The frame of the machine consists of a circular bed-plate 2, to which the operating mechanism is attached and which is supported at a suitable height from the floor-line on the legs 3. At the center of this bed-plate 2 is secured an upwardly-projecting turned stem 4, designed to receive a circular table 5, rotatable by means of a bevel-pinion 6 gearing into a bevel-gear 7, attached to the under side of the table or integral with it. The bevel-pinion 6 is secured to a shaft 8 in bearings 9, attached to or forming part of the bed-plate 2, and rotatable by means of the clutch member 10, slidable on a feather-key in the shaft 8, by which means the shaft may be caused to rotate with the belt-pulley 11, loose on the same shaft between collars $8^a$, the adjacent side of the boss or hub of the pulley 11 being provided with clutch members $11^a$ to correspond with those of the slidable clutch member 10. The slidable clutch member 10 may be moved in and out of engagement with the similar clutch members of the pulley 11 by means of a fork 12 in a circumferential groove $10^a$, the fork being attached to or forming a part of the slidable handle-bar 13, suitably guided in the machine bed-plate. On the opposite side of the bed-plate 2 to the position of the pulley-shaft 8 is attached a bracket 15, sustaining a flanged support 16 for the conveyer-belt 17, which brings the cans to the machine and carries them from it. This support 16 carries the conveyer-belt 17 at the approximate level of the upper surface of the table 5 and with the adjacent edge of the belt as a tangent to the outer edge of the table.

The belt 17 may be part of the conveyer system of a cannery plant, but in the machine illustrated is driven by a pulley on the shaft 40, rotatable in the bearings $16^b$ at the end of the belt-support 16 and $41^a$ on the bracket 41, attached to the bed-plate 2, the shaft 40 being driven by a chain 42 from the first-motion shaft 8 over chain-wheels 43 and 44.

Attached to the outer edge of the belt-support 16 and projecting over the belt and the outer portion of the table-surface at its point of contact with the belt is the can-guide 20, the edge $20^a$ of which, opposed to the movement of the cans to the machine, as indicated by the arrow $f$, is adapted to transfer them from the belt to the table, and its opposite edge $20^b$, opposed to the movement of the table, as indicated by the arrow $z$, will cause them to slide from the table back to the conveyer-band. The upwardly-projecting flange $16^a$ of the belt-support 16 on the side next to the table is carried around the can-paths to the table edge at both the entering and leaving side of the guide and has attached to it the exterior guard-ring 21, which encircles the table just within its edge and clear of its upper surface, being supported where necessary at intermediate points by attachments from the frame of the machine.

The position of the cans is limited to the outer portion of the table 5 by the inner guard-ring 22, secured to its upper surface.

Fitting loosely over the upwardly-projecting boss $5^a$ of the revoluble table is a thin flexible disk 23, the diameter of which is such as will leave uncovered a portion of the upper sides of the cans on the table 5, and this disk is caused to rotate with the table by means of upwardly-projecting studs 24 between the inner guard-ring 22 and the boss $5^a$. The disk is supported just clear of the top edge of the cans on the table by pins or other means of adjustment on the studs.

Situated on the opposite side of the machine to the delivery-guideway of the cans is a series of rollers 25, mounted on axles in a frame 27, so as to bear uniformly on the outer portion of the disk. The roller-frame 27 is provided with upwardly-projecting spindles 28, which are slidable vertically against the resistance of the coil-springs 30 in an overhead frame 29, secured at one end to the upper end of the stem 4, on which the table 5 rotates, and extending radially to beyond the limit of the table, then downward for attachment to the bed-plate 2 of the machine.

Integral with or attached to the upper side of the frame 29 is an elongated trough 30, forming a base for the hopper vessel 31. This trough is adapted to receive in the end bearings $30^a$ the spindle 32 of a cylinder 33, provided with projecting blades or stirrers $33^a$, which are inclined to the plane of rotation, so as to force the contents of the vessel to the outer end. The axis of this trough 30 and its stirrer-spindle is immediately over and parallel to the first-motion shaft 8, the stirrer-spindle being driven by the chain 34 from the shaft 40.

The outer end of the trough 30 terminates approximately over the outer edge of the disk 23, and at that end through a suitable opening, the bottom of which is level with the bottom of the inside of the trough, a slide 35 is designed to move endwise, being suitably guided outside the trough, as at 50. It is provided with a rectangular trough-opening $35^a$ near the inner end and is moved in and out by means of a pin at its outer end engaged by a lever 36, fixed to a vertical stem 37, susceptible of being rocked in its bearings in the horizontal members of the support-frame 29. This stem 37 is constrained to force the slide in by the torsional effort of the spring 39, attached to a downward prolongation of it, and secured to the stem 37 at a height to suit the cans on the table 5 is the bent lever 38, designed to project through the opening $21^a$ of the exterior guard-ring into the path of the passing cans on the table and adapted to be engaged by them and moved in and out, similarly operating the slide 35 through the stem 37 and lever 36. The movement of the slide is such that when in its normal or extreme inward position the opening $35^a$ is immediately under the curved pressers $33^b$, and when drawn out by the presence of a can immediately under it it is just clear of the trough and immediately over the portion of the can exposed beyond the edge of the disk.

Secured to the frame 29 is a spring 45, (see Fig. 6,) the end of which has a downward convexity adapted to press into the opening $35^a$ in the slide and be lifted up and out as the slide is moved in.

The operation of the machine is as follows: The salt, condiment, or whatever it is desired to deposit in measured quantity in each can is placed in the hopper vessel 31 and kept in a loose condition and worked up toward the slide end by the angled stirrers $33^a$, while the curved pressers $33^b$ force the material into the opening $35^a$ of the slide 35. The cans traveling with the belt 17 in the direction of the arrow $f$ are engaged by the edge $20^a$ of the guide 20 and are directed off the belt on to the table 5, rotating in the direction of the arrow $z$. As the table brings them under the spring-loaded rollers 25 the disk is pressed down on the upper edges of the cans and holds them tight to the table, and each one as it comes opposite the lever 38 presses it out, and through the mechanism of the vertical stem 37 and the lever 36 the slide 35 is withdrawn with its aperture $35^a$ filled with the salt or other material with which the hopper vessel 31 is charged. When the slide is drawn to its limit, which is immediately over the exposed portion of the operating-can beneath, the curved end of the spring 45 drops into the aperture $35^a$, and what it contains falls into the can beneath. As further rotation of the table carries the can forward the spring 39 on the stem 37 forces the slide into the trough 30 to receive a fresh supply and simultaneously the actuating-lever 36 into the path of the next can approaching, and the former action is repeated with each successive can. The served cans are carried around on the table 5, the pressure of the rollers on the disk is relieved, and as the cans approach the delivery side of the machine the disk is being kept clear of them by the pressure of the rollers on the opposite side of the disk-supports on the studs 24. As the table brings the cans toward the conveyer-belt they are engaged by the edge $20^b$ of the guide 20 and are swept again onto the surface of the belt 17 to be conveyed away.

It will be seen from the foregoing description that the operation of the machine is extremely simple; that it is perfectly automatic and requires no spacing of the cans on belt or table, as if a can is not on the table in position to receive its supply of salt the supply is not forthcoming, and, conversely, if the can is in position and there is salt in the vessel it must receive it, as the salt is crowded to the end of the trough immediately over the slide by the angled blades 33$^a$ and is forced into the aperture 35$^a$ by the bent blades 33$^b$, and the mechanism which withdraws the slide can only be operated by a can in position to receive the contents of the aperture 35$^a$.

Having now particularly described my invention, what I claim as new, and desire to be protected in by Letters Patent, is—

1. In a machine for the purposes specified, a conveyer-belt, a rotary table for receiving cans from the conveyer-belt, a containing vessel for salt or other material arranged above the table, can-operated devices for feeding a predetermined quantity of the material to the cans, a guard-ring for limiting the position of the cans on the table, a flexible disk rotating with the table and supported above the table, and means whereby such disk may be pressed down on the top edges of the cans as they pass beneath the containing vessel for holding them tight to the table.

2. In a machine for the purposes specified, a rotatable table, adapted to receive and carry cans with it, an inner guard-ring secured to the table, an outer guard-ring secured to the frame of the machine, a flexible disk, of such diameter as to leave a portion of the cans uncovered, supported above the cans on the table and rotating with the table, means for pressing the disk down on the cans and gripping them to the table, a lever projecting into the path of the cans, and adapted to be engaged and moved by them as they pass, a containing vessel, a measuring-slide connected to and operated by the can-operated lever for depositing a predetermined quantity of the material from the containing vessel into the cans, as set forth.

3. In a machine for measuring and depositing salt or similar material into cans, having a rotating table on which the cans are received, and a disk partially covering the cans rotating with the table, means for pressing the disk down on the cans and holding them tight on the table at a certain place; a hopper vessel above such position; a measure slidable in the end of the vessel; a lever projecting into the path of the cans on the table and adapted to be operated by them; a stem to which such lever is secured; a lever secured to the same stem and connected to the measuring-slide; a spring whereby the slide is forced into the hopper vessel; and means within the vessel whereby the material in it is stirred and pressed into the measure of the slide.

4. In a machine for applying salt to cans of meat or fish; an elongated trough forming the base portion of the vessel containing the salt; a measure slidable within such trough; a series of stirrers rotatable with a spindle, and adapted to crowd the salt toward the slidable measure; curved pressers, rotatable with the spindle, and adapted to fill the measure in the slide; means whereby the stirrer-spindle may be rotated from the shaft which operates the machine; and means whereby the slidable measure may be withdrawn and its contents deposited in a can beneath.

5. In a machine for the purpose specified, a containing vessel, a slide member in said containing vessel, a measuring-aperture in such slide member, and means whereby such slide is operated by a can beneath; a spring bearing on the upper surface of the slide immediately over the exposed portion of the operating-can and adapted to fall into the measuring-aperture when the slide is withdrawn, and a spring to return the slide within the containing vessel and its operating mechanism to be engaged by the next advancing can.

6. In a machine for the purpose specified, a rotatable table, and a guard-ring thereon, a second guard-ring fastened to the frame of the machine for limiting the position of the cans on the table; upwardly-projecting studs within the can-ring of the table; a thin flexible disk of a diameter to partially cover the tops of the cans on the table and be engaged and rotated by the studs; pins or other means of sustaining on the studs, the disk, just clear of the top edges of the cans; conical rollers above the outer ring of the disk at the side of the machine opposite the point of exit of the cans; a carriage or frame sustaining such rollers; upwardly-projecting stems on the roller-carriage adapted to slide vertically in an overhead part of the machine-frame; and coil-springs between the roller-carriage and the frame in which the stems slide, whereby the one side of the disk is pressed down on the cans beneath, and the other side lifted clear of the cans entering and leaving the machine.

7. A machine of the class described, comprising in combination, the bed-plate 2, the shaft 8 mounted on said bed-plate, a pulley 11 mounted on the shaft 8 at one end, a clutch 10 11$^a$ for bringing the pulley 11 into operative engagement with the shaft 8, a pinion 6 mounted on the other end of the shaft 8, the table 5 mounted on a stem 4, the gear 7 meshing with the pinion 6, said stem 4 being mounted on the bed-plate 2, the disk 23, spring-operated devices 25 for holding the disk 23 in engagement with the cans, the containing vessel 31, stirring devices 33, within said containing vessel, and mounted on a spindle 32, geared with a shaft 40 mounted on the bed-plate 2, said shaft 40 being geared with the drive-shaft 8, the measuring-slide 35, connected by a lever 36 to a shaft 37, mounted on the bed-plate 2, a lever 38 mounted on the shaft 37 for engaging the cans as they rotate with the table, whereby to operate the measuring-slide 35, guard-rings 21 22 for holding the cans on the table, and the conveyer-belt 17, all being arranged substantially as shown and for the purposes described.

In testimony whereof I have signed my name to this specification in the presence of two subscribing witnesses.

JOHN KELLINGTON.

Witnesses:
ROWLAND BRITTAIN,
ELLICE WEBBER.